(12) United States Patent
Koprivica

(10) Patent No.: US 6,687,239 B1
(45) Date of Patent: Feb. 3, 2004

(54) METHOD FOR DYNAMIC CHANNEL ALLOCATION IN A FREQUENCY HOPPING RADIO SYSTEM

(75) Inventor: Milosh Koprivica, Richmond (CA)

(73) Assignee: VTech Telecommunications, LTD, Tai Po (HK)

( * ) Notice: Subject to any disclaimer, the term of this patent is extended or adjusted under 35 U.S.C. 154(b) by 0 days.

(21) Appl. No.: 09/566,371

(22) Filed: May 8, 2000

(51) Int. Cl.[7] .................................................. H04Q 7/28
(52) U.S. Cl. ...................... 370/341; 370/433; 370/437; 375/132; 455/434; 455/513
(58) Field of Search ................................. 370/252, 329, 370/332, 333, 341, 431, 433, 437; 375/132; 455/434, 514, 513, 515

(56) References Cited

U.S. PATENT DOCUMENTS

| | | | | |
|---|---|---|---|---|
| 5,103,461 | A | * | 4/1992 | Tymes .......................... 375/141 |
| 5,541,954 | A | | 7/1996 | Emi |
| 5,737,359 | A | | 4/1998 | Koivu |
| 6,115,407 | A | | 9/2000 | Gendel et al. |
| 6,252,910 | B1 | * | 6/2001 | West et al. ................... 375/261 |

FOREIGN PATENT DOCUMENTS

| | | |
|---|---|---|
| GB | 2 261 141 A | 5/1993 |
| GB | 0111197 | 12/2001 |

* cited by examiner

Primary Examiner—Dang Ton
Assistant Examiner—Inder Pal Mehra
(74) Attorney, Agent, or Firm—Shaw Pittman LLP

(57) ABSTRACT

A method of dynamic channel allocation in a frequency hopping communications system is disclosed providing improved efficiency and reliability. During the course of communications between a plurality of transceivers over a frequency hopping wireless communications link, a transceiver begins evaluating the performance of each channel in the hop sequence, starting at a fixed point in the sequence. The transceiver proceeds sequentially through the hop sequence, until a channel fails to satisfy a predetermined quality criterion. A channel which fails to satisfy the quality criterion is considered bad, and substituted with a replacement channel from a set of available channels via an unacknowledged channel replacement command. The channel evaluation process is subsequently reinitiated beginning anew at the fixed point in the hop sequence, thus operating to maintain a set of consecutive good channels.

5 Claims, 3 Drawing Sheets

METHOD FOR DYNAMIC CHANNEL ALLOCATION IN A FREQUENCY HOPPING RADIO SYSTEM

BACKGROUND OF THE INVENTION

Devices incorporating wireless communications techniques are becoming increasingly prevalent in modem society. An inevitable result of this trend is that frequency spectrums are becoming more crowded and prone to interference. At the same time, consumers are becoming increasingly concerned about the privacy and security of communications, Consequently, systems engineers designing a variety of wireless communications systems, including cellular and cordless telephones, are increasingly turning to digital spread spectrum signaling methods to achieve better voice quality, greater security, and more efficient bandwidth utilization than can be achieved with conventional signaling methods, such as amplitude or frequency modulation without bandwidth spreading.

One popular spread spectrum signaling technique is frequency-hopping spread spectrum ("FHSS"). A FHSS transceiver operates by rapidly changing its tuned carrier frequency in a known pattern, called the hop sequence. By using different hop sequences, multiple users can communicate simultaneously over differing communications channels all within a common frequency bandwidth. FHSS offers better voice quality than other solutions in noisy environments because a short segment of voice data transmitted on a "bad" channel is simply muted. When the number of bad channels in the hop sequence is relatively low, the resultant degradation in voice quality is not noticeable to the user.

Another aspect of FHSS systems which is particularly advantageous is the ability to circumvent interference at a particular frequency by dynamically changing the channels in the hop sequence, substituting a new frequency channel for a detected/identified "bad" channel. Numerous methods of monitoring channel performance and determining when a channel should be removed from the hop sequence are known in the art. However, the specific implementation of typical FHSS protocols compromises the effectiveness of many prior art dynamic channel allocation techniques in extremely noisy environments.

For example, many FHSS systems transmit traffic information in predetermined data packet structures consisting mostly of primary traffic data, and sometimes containing some lesser amount of secondary control data. For example, in the context of a wireless telephone, a typical data packet transmitted/exchanged during the course of a conversation may be comprised primarily of voice data, with a small allocation for any control information that may be necessary, such as link control commands. Because of the minimal bandwidth allocated to control data, a complete command to substitute a poor frequency channel in the hop sequence must generally be broken up and transmitted in the control data field of multiple packets. As a result, channel substitution transmissions are much more sensitive to errors than any given primary traffic transmission, because an error in any one of the multiple packets in which the control command is transmitted will result in a failed substitution. Furthermore, transmission of a channel substitution command takes appreciably more time than transmission of a single traffic packet. While these factors are inconsequential when the communications link is clean, they can seriously degrade the efficacy of dynamic channel allocation techniques in the presence of significant interference. Indeed, as the packet error probability goes up in a system that divides a channel substitution command into five transmitted packets, the probability of a failed channel substitution increases at five times the rate of the probability of a packet error. Consequently, dynamic channel allocation performance breaks down in extremely noisy environments.

Although channels could be allocated more quickly and with less chance of error by transmitting the substitution command in a data packet comprised entirely of command data, such a dedicated data packet structure necessarily requires an undesirable interruption in the throughput of the voice data. Such an interruption results in the user's voice being temporarily "blanked" during transmission of the command data packet.

Another problem faced by many prior art dynamic channel allocation techniques is ensuring that a receiving party properly receives a channel substitution command sent by a transmitting party. Without confirmation that a channel substitution was received, the transmitting party may begin communicating on a channel that is not tuned by the receiver. Thus, all communications on that channel in the hop sequence would cease, and muting of the voice signal may result. Furthermore, because channel substitutions typically occur only when communicating in a noisy environment, the risk of a transmitted channel substitution command being received improperly is significant.

One approach to ensuring receipt of channel substitution commands is the introduction of handshakes between communicating parties to confirm that a channel substitution request was properly received before the request is carried out. However, such request-reply command pairs further increase the throughput required to enact each substitution. In particularly noisy systems, it may be desirable to exchange multiple handshake signals. As a result, either the rate at which noisy channels can be replaced is reduced, or the voice data throughput is further sacrificed; either effect results in increased muting of the voice channel.

It is therefore an object of this invention to provide a method of applying known dynamic channel allocation techniques in a way that the continuity of primary traffic is preserved under conditions of minor interference, and yet a communications link suffering heavy interference can be maintained and rapidly improved.

SUMMARY OF THE INVENTION

This invention consists of a method of dynamic channel allocation in a frequency hopping communications system. Specifically, this method provides improved efficiency and reliability of channel replacement over prior art techniques.

The invention involves a wireless communications link between two or more transceivers. While the invention will be explained in the context of a link between two wireless transceivers, the methods could be applied by one of ordinary skill in the art to systems involving any number of transceivers that are time or frequency division multiplexed on a common link.

In one embodiment of the invention, a first and second transceiver engage in a frequency hopping wireless communication link. During the course of the communications, a transceiver begins evaluating the performance of each channel in the hop sequence, starting at a fixed point in the sequence. The transceiver proceeds sequentially through the hop sequence, until a channel fails to satisfy a predetermined quality criterion. A channel which fails to satisfy the quality criterion is considered bad.

Upon locating a bad channel, the transceiver selects a replacement channel from a set of available channels. The bad channel is then replaced in the hop sequence by the replacement channel. dr

DETAILED DESCRIPTION OF THE INVENTION

Figure 1:
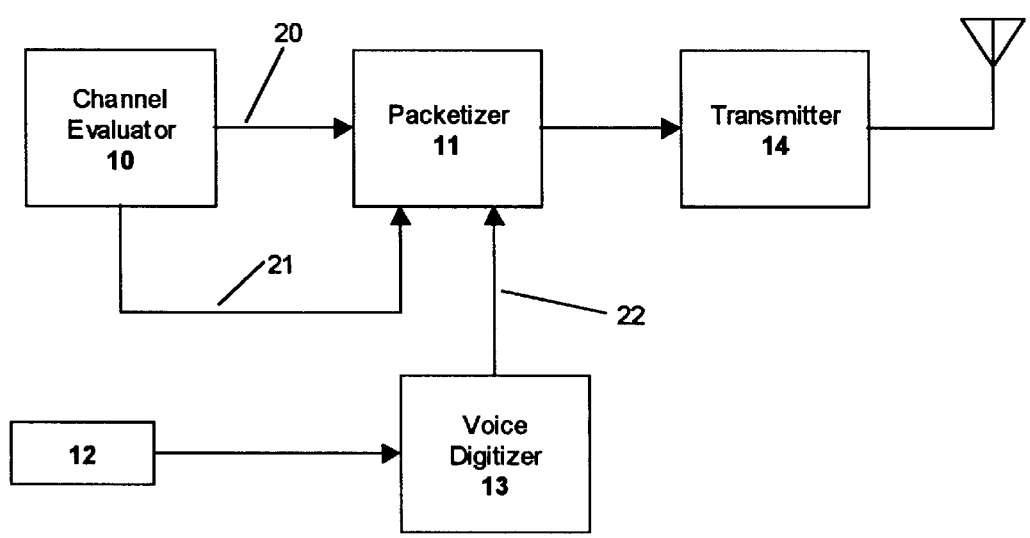
FIG. 1 is a schematic block diagram of one embodiment of the invention, whereby a wireless telephone can dynamically optimize the communications link performance by allocating channels and data packet content.

While this invention is susceptible to embodiment in many different forms, there are shown in the drawings and will be described in detail herein specific embodiments, with the understanding that the present disclosure is to be considered as an exemplification of the principle of the invention and is not intended to limit the invention to embodiments illustrated.

FIG. 1 of the drawings illustrates an embodiment of the present invention as implemented in a wireless telephone. In the embodiment illustrated, the telephone sends a combination of voice data and control data as necessary to implement an optimal dynamic channel allocation technique. The schematic block diagram of FIG. 1 illustrates only the elements of the wireless telephone which are specifically referenced in this invention. In order to clarify the present invention, further detail as to the operation and design of wireless telephones is not included because such detail is well known in the art and not necessary to the understanding of this invention.

Channel Evaluator 10 includes an error detection subcircuit, which is known in prior art circuits for performing dynamic channel allocation in a FHSS system. The error detection subcircuit monitors the occurrence of errors on each frequency channel in the hop sequence, and maintains a quality figure of merit for each channel according to its index number. The index number is simply the position of the frequency channel in the hop sequence. Channel Evaluator 10 also stores a threshold value for the channel quality figure of merit, such that any channel which fails to meet the threshold quality is deemed to require replacement. Finally, channel evaluator 10 compares the quality figures of merit of each frequency channel against the threshold value. The total number of channels failing to meet the threshold quality level is output to packetizer 11 via connection 20, while lowest hop sequence index number containing a frequency channel which fails to meet the threshold quality level is output via connection 21.

The wireless telephone voice path of this embodiment includes audio transducer 12, and voice digitizer 13. Voice digitizer 13 may include an analog-to-digital converter, and a vocoder, as is known in the art. The digitized audio is sent to packetizer 11 via connection 22.

Figure 3:
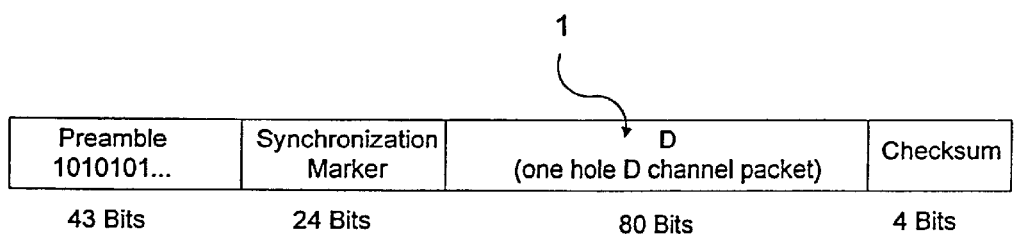
FIG. 3 is a diagram of a DMUX packet structure.
Figure 2:
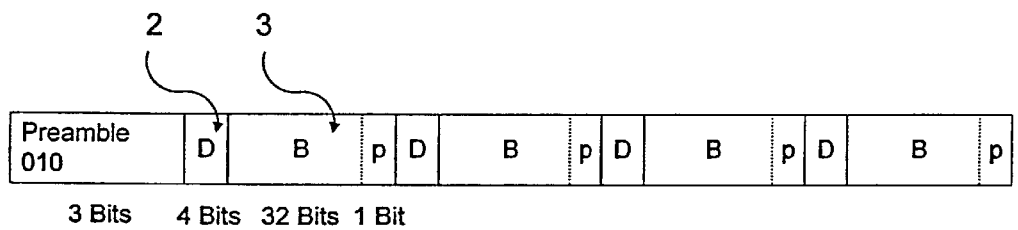
FIG. 2 is a diagram of a VMUX packet structure.

Packetizer 11 forms data packets for transmission. Packetizer 11 first determines the type of data packet to transmit, then forms the data packet with the appropriate information, and finally sends the data packet to the transmitter circuitry for transmission. In this embodiment, packetizer 11 can choose between the VMUX data packet structure depicted in FIG. 2, which includes 128 bits of voice data and 16 bits of control data, and a DMUX data packet structure depicted in FIG. 3, which is an 80-bit control data packet with no voice data. A complete control data packet is comprised of 80 bits of data; specifically, 16 synchronization bits, an 8-bit packet header, 40 bits of content, and a 16-bit CRC. Thus, transmission of each 80-bit control data packet requires either one DMUX packet or five VMUX packets.

When a channel substitution is required, packetizer 11 transmits a control data command to substitute the channel contained in the lowest-indexed hop sequence position that requires substitution, which position is received from channel evaluator 10 via connection 21. By always substituting the lowest position channel, the receiver optimally attempts to maintain a continuous sequence of "good" channels in the hop sequence. By maintaining consecutive good channels, control commands sent on a multitude of VMUX packets are more likely to be received without error.

In addition to the advantages of maintaining consecutive good channels, the process of always replacing the lowest position bad channel also eliminates the need for either periodic broadcasting of the entire hopping pattern, or multiple request-reply pairs to confirm successful channel replacement by all transceivers. If transmitter 14 broadcasts a channel substitution that is not properly received by the intended recipient, channel evaluator 10 will promptly flag the very same hop sequence position as containing a bad channel. Another channel substitution command directed to the same hop sequence position would then be sent. Thus, just as in a system using requestreply pairs to confirm successful channel substitution, the system depicted in FIG. 1 repeatedly tries to replace a bad channel in a given hop sequence position until that channel is successfully replaced. By eliminating the need for request-reply pairs or periodic hopping pattern broadcast, the system of FIG. 1 implements dynamic channel allocation with minimal reduction in voice data throughput.

Figure 4:
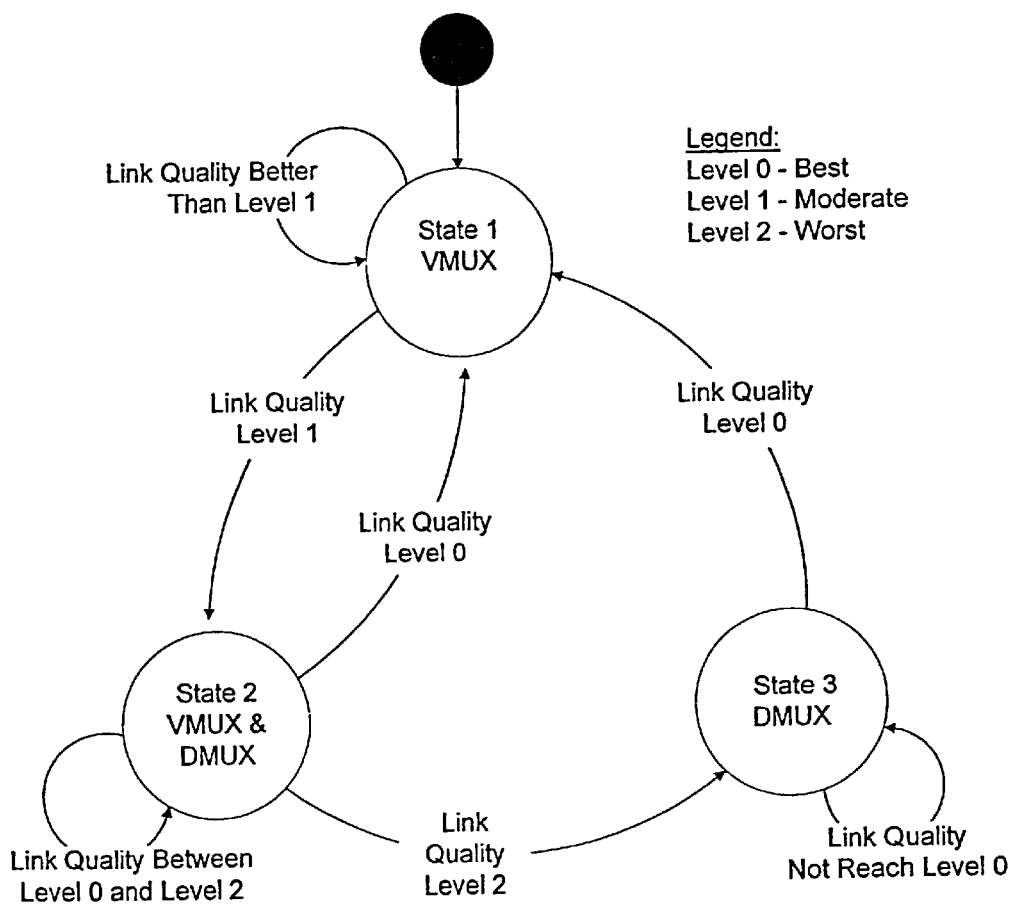
FIG. 4 is a state diagram of one aspect of the invention providing a level of dynamic control over data packet content, according to one possible embodiment.

Packetizer 11 determines which data packet structure to utilize based upon the input from connection 20, according to the state diagram depicted in FIG. 4. Circuit operation begins in State 1, transmitting traffic data in VMUX packets. If the input from connection 20 remains below a predetermined threshold value, link quality is considered "Level ", and packetizer 11 remains in State 1.

If the input from connection 20 exceeds a first threshold, packetizer 11 enters State 2, in which a mixture of VMUX and DMUX packets are transmitted. While the users voice will be muted for an instant during transmission of the occasional DMUX packet, each DMUX will carry a complete channel substitution command, thereby enabling rapid and reliable placement of poor frequency channels in the hop sequence. If the value received by packetizer 11 from channel evaluator 10 via connection 20 falls below the first threshold, packetizer 11 returns to State 1, transmitting VMUX packets.

While in State 2, transmission of DMUX packets should begin at the first position each time through the hopping pattern. Starting at the lowest position ensures that the DMUX packets are transmitted over the channels that are most likely to be good.

The proportion of VMUX to DMUX packets transmitted while in State 2 can be either fixed or dynamically variable. VMUX packets should be transmitted in consecutive groups of a size equal to an integer multiple of the number of VMUX packets required to transmit one full control data command. Hence, in the embodiment illustrated here, the proportion of VMUX to DMUX packets could potentially be 3 to 1, 9 to 1, 27 to 1, etc. A predetermined proportion of VMUX to DMUX might be 10 to 1. A dynamically variable proportion of VMUX to DMUX might vary between 5 to 1 and 50 to 1, with the proportion of DMUX packets increasing as the value received via connection 20 increases above the first threshold.

If the value received via connection 20 exceeds a second threshold while in State 2, packetizer 11 enters State 3. In State 3, packetizer 11 forms exclusively DMUX packets. Voice transmission is suspended while channel substitution commands are transmitted. Packetizer 11 remains in State 3 until the value received via connection 20 falls below the first threshold, in which case packetizer 11 returns to State 1.

Data packets formed by packetizer 11 are output to transmitter 14, which includes circuits to modulate and amplify the signal for wireless transmission.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

I claim:

1. A method for selecting a plurality of channels over which at least a first wireless transceiver and a second wireless transceiver communicate, in which at least the first transceiver measures the quality of communications on each channel of the plurality of channels on which it communicates, which method comprises the following steps performed repeatedly:

comparing the measured quality of each channel to a predetermined threshold, starting at the beginning of the plurality of channels and progressing in a known order through the plurality of channels, until the measured quality of a selected channel fails to meet the predetermined threshold;

identifying to the second transceiver by the first transceiver the selected channel with a measured quality that fails to meet the predetermined threshold;

removing the selected channel from the plurality of channels over which the first and the second transceivers communicate;

inserting an unused channel into the plurality of channels in place of the removed channel;

whereby bad channels will be replaced in a manner which attempts to maintain a contiguous series of good channels at the beginning of the hop sequence.

2. A method for communicating digital data over a wireless communications link via packets transmitted sequentially over a plurality of frequency channels, said packets comprised of at least potentially varying proportions of primary data content and/or secondary control data, which method comprises:

evaluating the quality of communications on each channel in the plurality of channels;

recognizing each channel which fails to meet a predetermined quality criterion as requiring substitution;

determining the overall quality of the communications link by the number of channels which require substitution;

selecting the quantity of control data contained in each data packet transmitted based upon the overall quality of the communications link;

transmitting data according to the selected data packet content;

whereby control data throughput can be increased when the communications link includes numerous bad channels, thereby facilitating more rapid and reliable replacement of the bad channels.

3. The method of claim 2, where the step of selecting a quantity of control data contained in each data packet transmitted further includes the substeps of:

selecting data packets according to a first data packet format including both primary traffic data and secondary control data, when the quality of the communications link meets or exceeds a predetermined threshold;

selecting data packets according to a second data packet format including secondary control data and an absence of primary traffic data, when the quality of the communications link falls below the predetermined threshold.

4. The method of claim 2, where the step of selecting a quantity of control data contained in each data packet transmitted further includes the substeps of:

selecting data packets according to a first data packet format including both primary traffic data and secondary control data, when the quality of the communications link meets or exceeds a first predetermined threshold;

selecting a combination of data packets according to the first data packet format and data packets according to a second data packet format, which includes secondary control data and an absence of primary traffic data, when the quality of the communications link is between the first predetermined threshold and a second predetermined threshold;

selecting data packets according to the second data packet format when the quality of the communications link meets or falls below the second predetermined threshold.

5. The method of claim 4, in which the substep of selecting a combination of data packet formats when quality of the communications link is between the first and second predetermined thresholds further includes the substep of varying the proportion of selected packets according to the second data packet format inversely with the quality of the communications link.

* * * * *

UNITED STATES PATENT AND TRADEMARK OFFICE
CERTIFICATE OF CORRECTION

PATENT NO.    : 6,687,239 B1
DATED         : February 3, 2004
INVENTOR(S)   : Koprivica It is certified that error appears in the above-identified patent and that said Letters Patent is hereby corrected as shown below:

Column 5,
Line 30, "the quality" should be -- quality --
Line 31, "the plurality" should be -- a plurality --
Line 34, "quality of each channel" should be -- quality of communications on each channel --
Line 37, "the measured quality" should be -- a measured quality --
Line 41, "a measured quality" should be -- the measured quality --
Line 47, "channel;" should be -- channel, --
Line 50, "the hop sequence" should be -- a hop sequence --
Line 52, "via packets" should be -- via data packets --
Line 54, "proportions of primary data content and/or" should be -- proportions of one or more of primary data content and --

Column 6,
Line 2, "plurality of channels" should be -- plurality of frequency channels --
Line 3, "each channel which fails" should be -- each of the plurality channels that fails --
Line 5, "the overall quality of the communications link by the number" should be -- overall quality of the wireless communication link by a number --
Line 6, "require substitution" should be -- require substitution as determined in the recognizing step --
Line 10, "the communication link" should be -- wireless communication link; and
Line 11, "data packet content" should be -- quantity of control data contained in each data packet transmitted --
Line 13, "the communications" should be -- the wireless communications --
Line 16, delete "the"
Line 17, "where" should be -- wherein --
Lines 17-18, "a quanity" should be -- the quantity --
Line 22, "the quality of communications" should be -- overall quality of the wireless communications --
Line 23, "predetermined threshold" should be -- predetermined threshold; and --
Line 26, "when the" should be -- when the overall --
Line 29, "where" should be -- wherein --
Lines 29-30, "a quantity" should be -- the quantity --
Lines 34 and 41, "the quality of the communications link" should be -- the overall quality of the wireless communications link --

UNITED STATES PATENT AND TRADEMARK OFFICE
CERTIFICATE OF CORRECTION

PATENT NO. : 6,687,239 B1
DATED : February 3, 2004
INVENTOR(S) : Koprivica

It is certified that error appears in the above-identified patent and that said Letters Patent is hereby corrected as shown below:

<u>Column 6 cont.,</u>
Line 43, "threshold;" should be -- threshold; and --
Line 49, "packets formats" should be -- packets --
Line 49, "quality of the communications link" should be -- the overall quality of the wireless communications link --
Line 50, "the substep of varying the proportion" should be -- a substep of varying a proportion --
Line 53, "the quality" should be -- the overall quality --

Signed and Sealed this

Fifth Day of October, 2004

JON W. DUDAS
*Director of the United States Patent and Trademark Office*